United States Patent Office 3,344,197
Patented Sept. 26, 1967

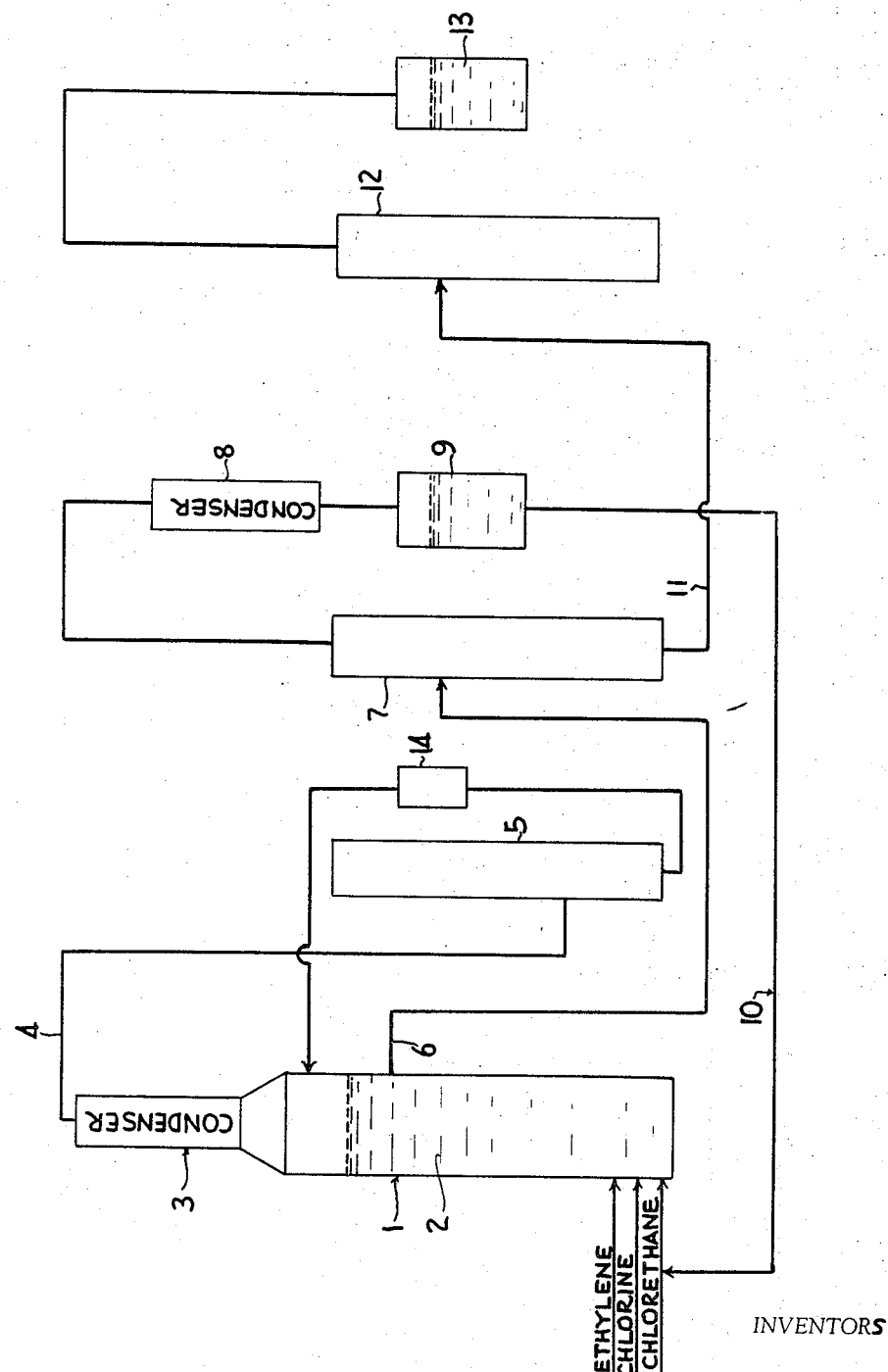

3,344,197
PRODUCTION OF 1,1,2-TRICHLOROETHANE FROM 1,2-DICHLOROETHANE AND CHLORINE
Charles Ronald Reiche, Corpus Christi, Tex., and Jefferson M. Jackson, Jr., Lake Charles, La., assignors to Pittsburgh Plate Glass Company, Pittsburgh, Pa., a corporation of Pennsylvania
Filed July 10, 1963, Ser. No. 294,088
5 Claims. (Cl. 260—658)

This invention deals with 1,1,2-trichloroethane. More particularly, it concerns the production of 1,1,2-trichloroethane from 1,2-dichloroethane and chlorine.

In one method described in the literature, 1,1,2-trichloroethane (hereinafter sometimes referred to as trichloroethane) is formed by feeding both ethylene and elemental chlorine into a liquid reaction medium of trichloroethane and 1,2-dichloroethane. U.S. 3,065,280 describes feeding above one but below two moles of chlorine per mole of ethylene to a liquid reaction body. When this mole ratio exceeds 1:1, both trichloroethane and 1,2-dichloroethane appear to be formed. In lieu of ethylene, 1,2-dichloroethylene may be employed according to this patent, presumably to emphasize production of trichloroethane.

However, when 1,2-dichloroethane and elemental chlorine are fed to a liquid reaction medium of trichloroethane and 1,2-dichloroethane with the aim of producing trichloroethane, the reaction proceeds at an abnormally slow rate. This rate of trichloroethane formation frequently drops intolerably low and jeopardizes the economics of such a procedure. Retention times for complete or acceptable utilization of chlorine lengthen to the point where reactor productivity drops below economically tolerable limits.

Now it has been discovered that 1,1,2-trichloroethane may be efficiently manufactured from 1,2-dichloroethane and chlorine by feeding along with these two major reactants a relatively minor amount of ethylene. This introduction of small amounts of ethylene to the liquid reaction medium has, among other things, been found to enhance the rate of 1,1,2-trichloroethane formation. Retention times are minimized, thus either increasing productivity of a given reactor or reducing reactor size required for given rates of production.

By comparison with the principal reactants, chlorine and 1,2-dichloroethane, the amount of ethylene effectively used in the performance of this invention is small and constitutes but a minor portion of the chlorinatable organics (mainly 1,2-dichloroethane). For example, in preferred embodiments of this invention hereinafter discussed in greater detail, upwards of 15, usually at least 25 to 40 (rarely more than 60) moles of 1,2-dichloroethane per mole of ethylene are employed. The ratio of chlorine to ethylene ranges upwards of 3.5:1. From about 0.1 to about 0.3, more usually 0.2 to 0.25 mole, of ethylene per mole of chlorine is the normal operating range.

Thus, the ethylene is employed in relative quantities so small that it need not alter materially the amount of product normally produced pursuant to the procedures contemplated by the present invention. That is, the method of this invention is performed such that the product equivalent of ethylene (the amount of trichloroethane which could be derived from this ethylene) is small by comparison with the amount of trichloroethane produced from the chlorine and 1,2-dichloroethane being simultaneously charged to the reaction system.

Typical preferred embodiments of this invention involve introducing the three principal feeds into a liquid reaction medium comprised primarily of trichloroethane and 1,2-dichloroethane. Ideal liquid reaction media contain from 3 to 19 parts by weight of 1,2-dichloroethane per part of 1,1,2-trichloroethane (contain between 5 and 25 percent 1,1,2-trichloroethane by weight of the trichloroethane and 1,2-dichloroethane). Minor amounts of other chlorinated ethanes such as 1,1,1-trichloroethane, the tetrachloroethanes, pentachloroethane and hexachloroethane also are apt to be present although their concentrations individually rarely exceed several per cent, e.g., 2 or 3 percent, by weight of the reaction medium. The feeds (reactants) are introduced well below the liquid level (and often near the bottom) of the reaction medium which in most instances has a vertical dimension of several feet, usually being at least 5 or 10 feet high. Reaction and trichloroethane formation occur in this liquid body. Temperatures and pressures are regulated (according to recommended embodiments) to avoid substantial volatilization of trichloroethane from the liquid body. Thus, the prime product is formed in the liquid medium and ultimately recovered therefrom. Hydrogen chloride byproduct, however, is gaseous under these conditions and hence escapes as gas.

Under most appropriate conditions of temperature and pressure, little if any trichloroethane is permitted to escape in the vapor phase from the reaction medium along with by-product hydrogen chloride. Other components normally boiling below trichloroethane (more volatile than trichloroethane), notably 1,2-dichloroethane, do usually exert a sufficient partial pressure to escape in significant quantites along with the gases emanating from the liquid reaction medium. Trichloroethane is recovered from the liquid reaction medium in continuous operations by withdrawing a portion of the medium (in which it is present in concentrations of from 5 to 25 percent). By distillation, the trichloroethane component can be separated.

The process herein contemplated is ideally suited and preferably operated on a continuous basis. First, a liquid reaction medium comprised predominantly of 1,2-dichloroethane and 1,1,2-trichloroethane, the trichloroethane being present in an amount more than 5 percent but not in excess of 25 percent, most usually in the range of 17 to 20 percent, by weight of these two principal chlorohydrocarbons, is established, for example, by simply mixing these two principal components in appropriate proportions. Ideally, the liquid reaction medium has a substantially vertical dimension of at least 5 feet, and quite often 20 or more feet, and typically is of a configuration such as is provided by a vertically disposed cylindrical reactor.

To a lower portion of this liquid body, 1,2-dichloroethane and elemental chlorine (gaseous or liquid) are fed continuously (preferably as separate streams). These feeds are proportioned consistent with that appropriate for the manufacture of trichloroethane. Simultaneously, ethylene (usually gaseous) is introduced on a continuous basis into a lower portion of the reaction body.

With the temperature of the liquid body and pressure imposed thereupon regulated to avoid loss of trichloroethane through vaporization, e.g., by maintaining the liquid body below the boiling temperature (at the prevailing pressure) of trichloroethane, little if any tricloroethane is permitted to leave the reactor as a gas. Gases leaving the reaction body are predominantly by-product hydrogen chloride and organics such as 1,2-dichloroethane which have a high enough partial vapor pressure at the prevailing conditions of temperature and pressure to be present in significant quantities. Inerts or other materials such as nitrogen, ethane (which may be introduced as a contaminant in the ethylene), low boiling chlorinated methanes, etc., if and when present will also tend to evolve from the liquid.

It is also most advantageous to insure that elemental chlorine does not escape from the liquid body in the gaseous mixture which evolves. Escape in the gases of elemental chlorine (besides indicating incomplete ineffective reaction in the liquid reaction body) provides serious difficulties and imposes limitations on the materials of construction which may be used for equipment in the purification end of the process.

By controlling the rate of ethylene fed to the liquid reaction body, the elemental chlorine can be substantially completely consumed, and hence precluded from escaping with evolved gases. Gases escaping from the liquid reaction body may be analyzed (continuously or on a frequent periodic basis, i.e., every one to four hours) to determine their free chlorine content, if any. In response to analyses indicating free (elemental) chlorine, the rate of ethylene feed is increased. However, since even small amounts of free chlorine can be disadvantageous, the preferred mode of operation involves feeding ethylene at a rate such that a minor portion escapes from the liquid body. Thus, the gases evolved from the liquid phase pursuant to better practices contain from 1 to 5, ideally about 3, mole percent ethylene. Other gases may also escape at times, including ethane (introduced as a contaminant in the ethylene), and 1,2-dichloroethane. Typically, ethylene constitutes 1 to 5 mole percent basis the non-condensables, e.g., excluding volatile but readily liquefiable components such as dichloroethane. Basis the hydrogen chloride, ethylene is present from 1.5 to 10, or higher, moles per 100 moles of hydrogen chloride.

The accompanying drawing schematically illustrates the production of 1,1,2-trichloroethane in accordance with the present invention.

At the outset, reactor 1 is charged with appropriate amounts of 1,2-dichloroethane and 1,1,2-trichloroethane to provide liquid reaction medium 2 containing between 5 and 25 percent trichloroethane by weight of the two chloroethanes. Liquid body 2 is then raised to a satisfctory temperature, e.g., above about 100° F. and more preferably to above 180° F., although rarely above 260° F.

Formation of 1,1,2-trichloroethane appears more favorable at temperatures above the normal boiling point of dichloroethane, about 182° F. To avoid excess vaporization of the dichloroethane (and the cooling effect of this vaporization), superatmospheric pressures, on the order of at least 20 pounds per square inch gauge but rarely above 200 pounds per square inch gauge are used. These pressures are those prevailing in the atmosphere at the liquid-gas interface of the liquid reaction medium.

Thereafter, elemental chlorine, notably liquid chlorine (although gaseous is operative), 1,2-dichloroethane as a liquid and gaseous ethylene are introduced into the lower portion of reactor 1. The specific ratios of these feeds are susceptible of considerable latitude, with the exception of the chlorine:ethylene ratio which should range upwardly of 3.5:1.

A considerable excess (over the amount to be consumed in formation of product) of dichloroethane is normally introduced, at least 5, but more normally upwards of 20, moles (rarely more than 60 moles) of dichloroethane per mole of chlorine. Such quantities of dichloroethane are involved because in the preferred mode of operation the dichloroethane is not only the principal organic reactant feed but also is the major component of the liquid reaction medium. Thus, the process proceeds best with but a minor portion of the dichloroethane being converted, as when the medium is maintained with 3 to 19 parts dichloroethane per part of trichloroethane by weight.

Once the liquid reaction body is brought up to suitable reaction temperature and production of trichloroethane commences, by-product hydrogen chloride evolves and rises in gaseous state from liquid body 2. It usually is accompanied with small amounts of 1,2-dichloroethane and, under ideal conditions, minor amounts of ethylene. This gaseous mixture rises into water cooled condenser 3 where its temperature is reduced sufficiently to liquefy a major portion, if not substantially all, the hydrocarbon chloride content (primarily 1,2-dichloroethane) of the evolved gases. Uncondensed gases (hydrogen chloride, ethylene, inerts such as nitrogen) leave condenser 3 and are forwarded via line 4 to absorber 5 wherein the remaining 1,2-dichloroethane content of the vapors are absorbed selectively into further 1,1,2-trichloroethane. In this fasion, substantially all the 1,2-dichloroethane content of the gases leaving condenser 3 are recovered.

Throughout the operation, a portion of the liquid reaction body is removed continuously via line 6, preferably from a point located remote to the feeds, usually at a level in the liquid reaction medium adjacent the liquid-gas interface. This liquid stream has a composition corresponding to that of the liquid reaction medium being predominantly 1,1,2-trichloroethane and 1,2-dichloroethane. It is forwarded to an intermediate level of distillation column 7 wherein the two principal components are separated by distillation. Thus, column 7 is operated to provide as overhead materials boiling lower than 1,1,2-trichloroethane, notably 1,2-dichloroethane. Overhead from column 7 is liquefied in water cooled condenser 8 and collected in holding drum 9 for recycle via line 10 to reactor 1.

Underflow from column 7 is fed via line 11 to an intermediate section of product still 12 which is operated to provide 1,1,2-trichloroethane as gaseous overhead. This overhead after being liquefied (by conventional expedients such as use of condensers, not shown) is collected in product storage drum 13. Underflow from column 12 (mainly highly chlorinated ethanes) is removed as desired for discard.

Not shown (for sake of simplicity) in the schematic drawing is the piping which enables 1,1,2-trichloroethane from bottom of still 7 to be used for operation of absorber 5. Hydrogen chloride is ultimately vented from the system (along with other non-condensables) after leaving overhead from absorber 5. The 1,2-dichloroethane stream from absorber 5 is recycled to the reactor after separating almost all the HCl in separation drum 14.

The following example describes the manner in which the present invention may be performed:

EXAMPLE

Reactor 1 is a nickel clad vertically disposed tubular shaped reactor 5 feet 6 inches in diameter and approximately 28 feet in height. It is charged with 1,2-dichloroethane and 1,1,2-trichloroethane in proportions such that the initial content of 1,2-dichloroethane is about 80 percent by weight of the two to provide a liquid body some 20 feet high in the reactor. About 3600 gallons of the two chlorohydrocarbons are charged. The temperature of the liquid body is then raised to about 245° F. while the pressure prevailing above the liquid in the reactor is 35 pounds per square inch gauge.

Thereafter, while maintaining these conditions of temperature and pressure, approximately 1492 pounds per hour of fresh 1,2-dichloroethane (at 100° F. and 66 pounds per square inch gauge), 1844 pounds per hour of liquid elemental chlorine and approximately 163 pounds per hour of ethylene (at 90° F. and 66 pounds per square inch gauge) are separately introduced near the bottom of the liquid body in the reactor. About 2 mole percent (or 3.5 pounds per hour) of ethane is introduced in the ethylene.

Removed from the liquid reactor via line 6 (located near but below the liquid level of the reaction medium) for the purpose of recovering trichloroethane is some 15,377 pounds per hour of liquid reaction body material. A typical composition of this liquid stream and hence the reaction body is as follows:

Material: Weight percent
- 1,2-dichloroethane _____ 80.9
- Trichloroethane _____ 18.0
- Tetrachloroethane (unsymmetrical) _____ 0.49
- Tetrachloroethane (symmetrical) _____ 0.57
- Pentachloroethane _____ 0.02

This product stream is then forwarded to a purification system (in this embodiment made in many places of iron or iron containing equipment) which includes as illustrated in the drawing a first still in which about 12,600 pounds per hour of 1,2-dichloroethane is separated from 1,1,2-trichloroethane. This as illustrated is recycled to the reactor and along with the fresh 1,2-dichloroethane constitutes the dichloroethane feed to the liquid body. A small amount of trichloroethane (usually less than about one percent by weight of the 1,2-dichloroethane) is usually present in this recycled stream.

Underflow from the first distillation column forwarded to a product still in which about 2400 pounds per hour of 1,1,2-trichloroethane is separated by distillation as an overhead to obtain substantially pure product (99.75 percent pure). Such product may include minor concentrations of 1,2-dichloroethane (usually less than 0.1 percent, typically 0.04 percent) and small amounts on the order of about 0.2 percent of the tetrachloroethanes may be present.

Condenser 3 during the course of this operation is so operated as to cool the gases evolving from the liquid reaction mixture to between 130° F. and 170° F., thus condensing most of the liquefiables and directly returning them to the reactor. After they leave the condenser, these gases are analyzed (continuously or periodically) to check for the presence of elemental chlorine. When the process is operating in the preferred manner, this gas stream should be free of chlorine and contain ethylene. It has a typical composition of:

Component: Mole percent
- Hydrogen chloride _____ 89.11
- Ethane _____ .44
- Ethylene _____ 3.16
- 1,2-dichloroethane _____ 7.29

The precise analytical test employed for determining the presence or absence of elemental chlorine may be varied in accordance with sound analytical processes.

While the foregoing describes a specific manner in which 1,1,2-trichloroethane may be efficiently produced from elemental chlorine and 1,2-dichloroethane, considerable latitude in operating conditions are permissible. For example, the amount of ethylene fed is kept at a minimum and under certain conditions of operation even less ethylene than is employed in the illustrative example may serve the purpose. Under other conditions where the reaction appears to be even more sluggish than usual, larger amounts of ethylene may be fed temporarily to overcome the temporary reduction in rate of product formation.

Also, while the described liquid reaction medium of trichloroethane and 1,2-dichloroethane is preferable, liquid media of other compositions are of use. The ratio of these two chloroethanes may be varied up to the point where the dichloroethane content is negligible. In lieu of the large excess of dichloroethane (which serves in effect as a diluent) other diluents may be employed including carbon tetrachloride, carbon bisulfide, chloroform, perchloroethylene, trichloroethylene, methylchloroform, sulfuryl chloride, monochlorobenzene, benzene, etc.

It is sound practice to minimize and even avoid the presence in the reactor of either elemental oxygen or iron chlorides. Both appear to exert inhibitory effects upon the reaction of 1,2-dichloroethane and chlorine in the formation of 1,1,2-trichloroethane. This invention does, however, by the addition of controlled small amounts of ethylene to the reaction body make it possible to sustain an economically tolerable rate of 1,1,2-trichloroethane formation despite the presence of what would otherwise be inhibitory concentrations of elemental oxygen or iron chloride.

Moisture or water is best kept as low as possible. To the extent it is economically realistic, anhydrous conditions are recommended.

One important reason for insuring the exit stream of gaseous material leaving the reaction be essentially free of elemental chlorine is that it is then feasible to fabricate from iron (or steel) stills, vessels, etc., in the purification system. Should elemental chlorine contact iron equipment, it can generate iron chloride which is recycled to the reactor would have a serious inhibitory effect upon the efficient operation of the reaction.

While the invention has been described by reference to specific details of certain embodiments, it is not intended the invention be construed as limited thereto except insofar as such details appear in the appended claims.

We claim:

1. In the method of producing 1,1,2-trichloroethane from chlorine and 1,2-dichloroethane wherein both chlorine and 1,2-dichloroethane are fed to a liquid reaction medium and therein reacted to form 1,1,2-trichloroethane, the improvement which comprises feeding ethylene to the medium in amounts of from 0.1 to 0.3 mole per mole of chlorine, such that the product equivalent of the ethylene is small by comparison with the amount of trichloroethane produced from chlorine and 1,2-dichloroethane.

2. In the production of 1,1,2-trichloroethane primarily from chlorine and 1,2-dichloroethane, the improvement which comprises feeding elemental chlorine and 1,2-dichloroethane to a liquid reaction medium of 1,1,2-trichloroethane and 1,2-dichloroethane and simultaneously feeding amounts of ethylene so small that its constitutes but a minor portion of the chlorinatable organic precursor of 1,1,2-trichloroethane being fed from 0.1 to 0.3 mole of ethylene per mole of chlorine.

3. The method of claim 2 wherein from 15 to 60 moles of 1,2-dichloroethane per mole of ethylene are fed.

4. A method of producing 1,1,2-trichloroethane which comprises feeding elemental chlorine and 1,2-dichloroethane to a liquid reaction medium as the principal reactants for the preparation of 1,1,2-trichloroethane while introducing ethylene into the reaction medium in an amount so small that the trichloroethane product equivalent of this introduced ethylene is small by comparison with the amount of trichloroethane provided from the 1,2-dichloroethane and such that the chlorine to ethylene feed ratio is at least 3.5:1.

5. In the method of producing 1,1,2-trichloroethane by feeding elemental chlorine and 1,2-dichloroethane to a liquid reaction medium and therein forming from such reagents 1,1,2-trichloroethane, the improvement which comprises improving the rate of 1,1,2-trichloroethane formation by also feeding to the reaction medium while therein forming 1,1,2-trichloroethane from chlorine and 1,2-dichloroethane ethylene in an amount which is small by comparison with the 1,2-dichloroethane fed to the reaction medium and which is from 0.1 to 0.3 mole per mole of chlorine.

References Cited

UNITED STATES PATENTS

| | | | |
|---|---|---|---|
| 2,929,852 | 3/1960 | Benedict | 260—660 |
| 3,065,280 | 11/1962 | Vogt | 260—660 XR |
| 3,173,963 | 3/1965 | Reiche et al. | 260—658 XR |

OTHER REFERENCES

Groggins, Unit Processes in Organic Synthesis, McGraw-Hill (1958), pp. 219–222, and 241–242.

LEON ZITVER, *Primary Examiner.*

K. V. ROCKEY, T. G. DILLAHUNTY,
*Assistant Examiners.*